2,791,486

PROCESS FOR MANUFACTURING ALUMINUM COMPOUNDS

Herbert R. Appell, Riverside, Ill., assignor to Universal Oil Products Company, Des Plaines, Ill., a corporation of Delaware No Drawing. Application September 27, 1954, Serial No. 458,711

8 Claims. (Cl. 23—50)

This application is a continuation-in-part of my co-pending application Serial No. 380,103 filed September 14, 1953, now abandoned.

This invention relates to an improved method of preparing aluminum compounds. It more specifically relates to a method of preparing hydroxyl substituted aluminum salts from an acid salt of aluminum.

Recently commercial uses of many of the hydroxyl substituted aluminum salts have been developed. Aluminum hydroxychlorides became important starting materials in the manufacture of catalysts and aluminum hydroxychlorides are also being directly used as antiperspirants. The process of this invention is particularly suitable for the manufacture of aluminum hydroxychlorides such as aluminum dihydroxychloride and aluminum hydroxydichloride which are represented by the formula $Al(OH)_2Cl$ and $AlCl_2OH$ respectively. Besides these basic salts of aluminum other basic aluminum salts such as basic aluminum sulfate and basic aluminum nitrate may be prepared. These compounds may be represented by the formulas $Al(SO_4)OH$ and $Al(NO_3)_2OH$ or $Al(NO_3)(OH)_2$ respectively. Modifications of the sulfate form are dialuminum tetrahydroxysulfate and trialuminum pentahydroxydisulfate. The process of this invention may be used as a basic step in preparing these aluminum salts.

In one embodiment the present invention relates to a method of preparing a hydroxyl substituted aluminum salt which comprises contacting a solution of a salt of aluminum with an anion exchange material in the hydroxyl form and recovering the effluent.

In a specific embodiment the present invention relates to a method of producing aluminum hydroxychloride which comprises contacting a solution of aluminum chloride with an anion exchange material in the hydroxyl form and recovering the effluent.

The salt of aluminum that is used as a starting material in the process of this invention is preferably an acid salt such as aluminum chloride, aluminum nitrate, aluminum sulfate, aluminum fluoride, etc., that is, salts which may be formed by the reaction of aluminum and a strong acid. The preferred acid salts are water soluble. It is preferred that an aqueous solution be used, however, other solvents may be used but generally the aqueous solutions show great advantages, and for this reason they are preferred. In some cases a monohydroxyl substituted aluminum salt may be used as a starting material which is converted to the dihydroxyl substituted aluminum salt according to the process of this invention. For example, aluminum hydroxydichloride may be used to produce aluminum dihydroxychloride. In the interest of simplicity the present specifications will be directed primarily to the manufacture of aluminum hydroxychlorides. However, it is understood that the novel features of the present invention may be employed for the manufacture of other hydroxyl substituted aluminum salts herein mentioned. It is understood that when these other hydroxyl substituted aluminum salts are to be manufactured, the corresponding acid salts will be employed. As for example, in the manufacture of aluminum hydroxynitrate, aluminum nitrate will be employed, etc. Similarly the novel features of the present invention may be employed for the manufacture of hydroxy substituted basic aluminum salts from aluminum organic salts such as aluminum acetate, aluminum butyrate, etc.

It will be noted that in accordance with the present invention a solution of a salt of aluminum is contacted with an anion exchange material in the hydroxyl form, and as hereinbefore mentioned, it is preferred that an aqueous solution of the salt be used.

Any suitable solid anion exchange material that can be converted to the hydroxyl form and that may be readily regenerated by the use of an alkaline reagent may be used in the process of my invention, however, weak and moderately basic anion exchange resins are preferred with the stronger anion exchange resins being less preferred. Examples of anion exchange resins that may be used in my process are those resins which are formed by the polymerization of an aromatic amine and formaldehyde or a polyamine, a phenol, and formaldehyde. An example of a resin in this group is a cross-linked, polystyrene, polyamine anion exchanger. Other suitable resins may be prepared by the nitration and subsequent reduction of a styrene-divinylbenzene copolymer. Among the commercially known resins that may be employed there may be mentioned Amberlite IR4B, Amberlite IR-45, De Acidite, Duolite A-2, Ionac A-300, and Wofatit M.

These anion exchange resins may be present in various physical forms such as powder or chips and a particularly suitable form is the spheroidal form. The anion exchange materials to be used are water insoluble, that is substantially water insoluble, and are in the solid form. One of the discoveries of my invention is, in fact, that solid anion exchange materials may be used to prepare the compounds of this invention. By the process of my invention these hydroxyl substituted basic aluminum salts are produced more cheaply and easily than heretofore possible.

Generally speaking, the anion exchange materials that are preferred can be regenerated by treatment with an alkaline solution and in the resulting hydroxylated condition they will substitute hydroxyl ions for the anions that are present in the aluminum salt. The anion exchange materials have satisfactory physical stability especially in reference to temperature so that they may be used at temperatures from the freezing point of the solution up to the boiling point of the solution, however, each ion exchange material is specific in reference to the maximum temperature at which it is stable. At the higher temperatures the rate of ion exchange is usually much more rapid, however, room temperatures are generally very satisfactory.

The main requirement of the anion exchange resin is that it should replace only a portion of the anion originally in the aluminum salt by a hydroxyl group (OH group) and for this reason, as hereinbefore mentioned, weakly basic and mildly basic anion exchange resins are preferred. The basic resin after use may be regenerated by an alkaline reagent such as sodium carbonate, sodium hydroxide, potassium carbonate, potassium hydroxide, ammonium hydroxide, etc., in fact almost any alkaline reagent is satisfactory.

The ratio of aluminum to hydroxyl ion in the hydroxyl substituted basic aluminum salt that is formed may be controlled in several ways, especially by adjusting the concentration of the salt solution, the amount of anion exchange resin, the contact time, and the strength of the anion exchange resin. For example, starting with aluminum chloride it is possible to substitute one hydroxyl for one of the chloride ions or two chloride ions may be exchanged for the hydroxyl ions. Using a weak solution of aluminum chloride at low space velocities, that is contacting the solution of aluminum chloride with the anion exchange material for a long length of time using a moderately basic anion exchange material, the product will contain a large amount of aluminum dihydroxychloride. Similarly, using a highly concentrated solution of aluminum chloride and subjecting the same to contact with a weak anion exchange material for a short period of time the product will consist mainly of the less substituted basic salt, that is aluminum hydroxydichloride. As hereinbefore mentioned, higher temperatures also generally favor higher exchange rates.

The invention may be practiced in a batch wise or continuous fashion. In the batch method the reactants and ion exchange material are placed in a suitable vessel and contacted, and the product subsequently separated by filtration or other suitable means. In the continuous process the ion exchange material is placed in a suitable reaction vessel and the solution is passed continuously therethrough in either upward or downward flow.

The process of the present invention may be practiced in any suitable type of equipment wherein the solution and anion exchange material are intimately contacted, and mixing devices may be used to insure uniform and thorough contacting.

The hydroxyl substituted salts differ in many physical properties from the salts from which they were prepared and the hydroxyl substituted salts may be separated from the solution in any suitable manner such as by crystallization, solvent extraction, selective absorption, etc.

The following example is given to illustrate the novelty and utility of the process of my invention but not with the intention of unduly limiting the generally broad scope of the invention.

Example 30 grams of aluminum chloride hexahydrate were dissolved in 70 grams of water. 25 ml. of this solution were then passed through a 5 ml. bed of commercial IR-45 Amberlite anion exchange resin which is a weakly basic cross-linked polystyrene, polyamine anion exchange resin. The solution and the anion exchange resin were maintained at room temperature and the solution was passed through in approximately thirty minutes. The solution entering the anion exchange resin had a pH of 1.4 and the exit stream had a pH of 3.9. The product was analyzed and showed an appreciable conversion of the aluminum chloride to aluminum hydroxychloride.

I claim as my invention:

1. A method of preparing a hydroxyl substituted basic aluminum salt which comprises contacting a solution of a salt of aluminum with a weakly basic, water insoluble anion exchange resin in the hydroxyl form and recovering the effluent.

2. The method of claim 1 further characterized in that said anion exchange resin is regeneratable by an alkaline reagent.

3. A method of preparing an aluminum salt containing at least one hydroxyl group which comprises contacting a solution of an acid salt of aluminum with a weakly basic, water insoluble anion exchange resin and recovering the effluent.

4. A method of producing aluminum hydroxychloride which comprises contacting a solution of aluminum chloride with a weakly basic, water insoluble anion exchange resin in the hydroxyl from and recovering the effluent.

5. A method of producing aluminum hydroxysulfate which comprises contacting a solution of aluminum sulfate with a weakly basic, water insoluble anion exchange resin in the hydroxyl form and recovering the effluent.

6. A method of preparing an aluminum hydroxynitrate which comprises contacting a solution of aluminum nitrate with a weakly basic, water insoluble anion exchange resin in the hydroxyl form and recovering the effluent.

7. A method of preparing dihydroxyl substituted basic aluminum salts which comprises contacting a solution of a salt of aluminum selected from the group consisting of acid salts of aluminum and mono-hydroxyl substituted aluminum salts and mixtures thereof with a weakly basic, water insoluble anion exchange resin in the hydroxyl form and recovering the effluent.

8. A method of producing aluminum dihydroxychloride which comprises contacting a solution of a salt of aluminum selected from the group consisting of aluminum chloride and aluminum hydroxydichloride with a weakly basic, water insoluble anion exchange resin and recovering the effluent.

References Cited in the file of this patent

Denk et al.: "Chemical Abstracts," vol. 47, page 3166(a) April 10, 1953.

Rohm and Haas Company, Washington Square, Philadelphia 5, Pa. advertisement "Insoluble, Sodium Hydroxide" in company trade publication of 1953.

Walton: "Journal of Chemical Education," September 1946, page 455.